United States Patent [19]

Phillips

[11] 4,422,991

[45] Dec. 27, 1983

[54] METHOD OF MAKING HOSE CONSTRUCTION

[75] Inventor: Alfred R. Phillips, Waynesville, N.C.

[73] Assignee: Dayco Corporation, Dayton, Ohio

[21] Appl. No.: 350,968

[22] Filed: Feb. 22, 1982

[51] Int. Cl.³ .............................................. B29C 17/07
[52] U.S. Cl. ....................................... 264/83; 264/85; 264/565; 264/150; 264/209.6
[58] Field of Search ................ 264/209.6, 83, 85, 565, 264/150

[56] References Cited

U.S. PATENT DOCUMENTS

| | | | |
|---|---|---|---|
| 2,497,046 | 2/1950 | Kropa | 264/83 |
| 2,502,841 | 4/1950 | Henderson | 428/195 |
| 2,690,769 | 10/1954 | Brown | 138/125 |
| 2,715,075 | 8/1955 | Wolinski | 264/83 |
| 2,811,468 | 10/1957 | Joffre | 264/83 |
| 3,126,581 | 3/1964 | Hollingsworth | 264/209.3 |
| 3,184,358 | 5/1965 | Utz | 156/244.14 |
| 3,528,260 | 9/1970 | Binder | 138/126 |
| 3,542,618 | 11/1970 | De Vaughn | 264/150 |
| 3,555,138 | 1/1971 | Bryan, Jr. | 264/83 |
| 3,560,166 | 2/1971 | Walles | 264/340 |
| 3,859,408 | 1/1975 | Voss et al. | 264/573 |
| 3,862,284 | 1/1975 | Dixon et al. | 264/83 |

Primary Examiner—Jeffery R. Thurlow
Attorney, Agent, or Firm—Joseph V. Tassone

[57] ABSTRACT

A hose construction and method of making same are provided wherein such hose construction comprises a polyolefin tube which has a tubular fluorocarbon barrier layer defining the inner portion of the tube and such barrier layer renders the tube substantially impermeable to the passage of nonpolar hydrocarbons present in the fluid being conveyed through the hose.

5 Claims, 5 Drawing Figures

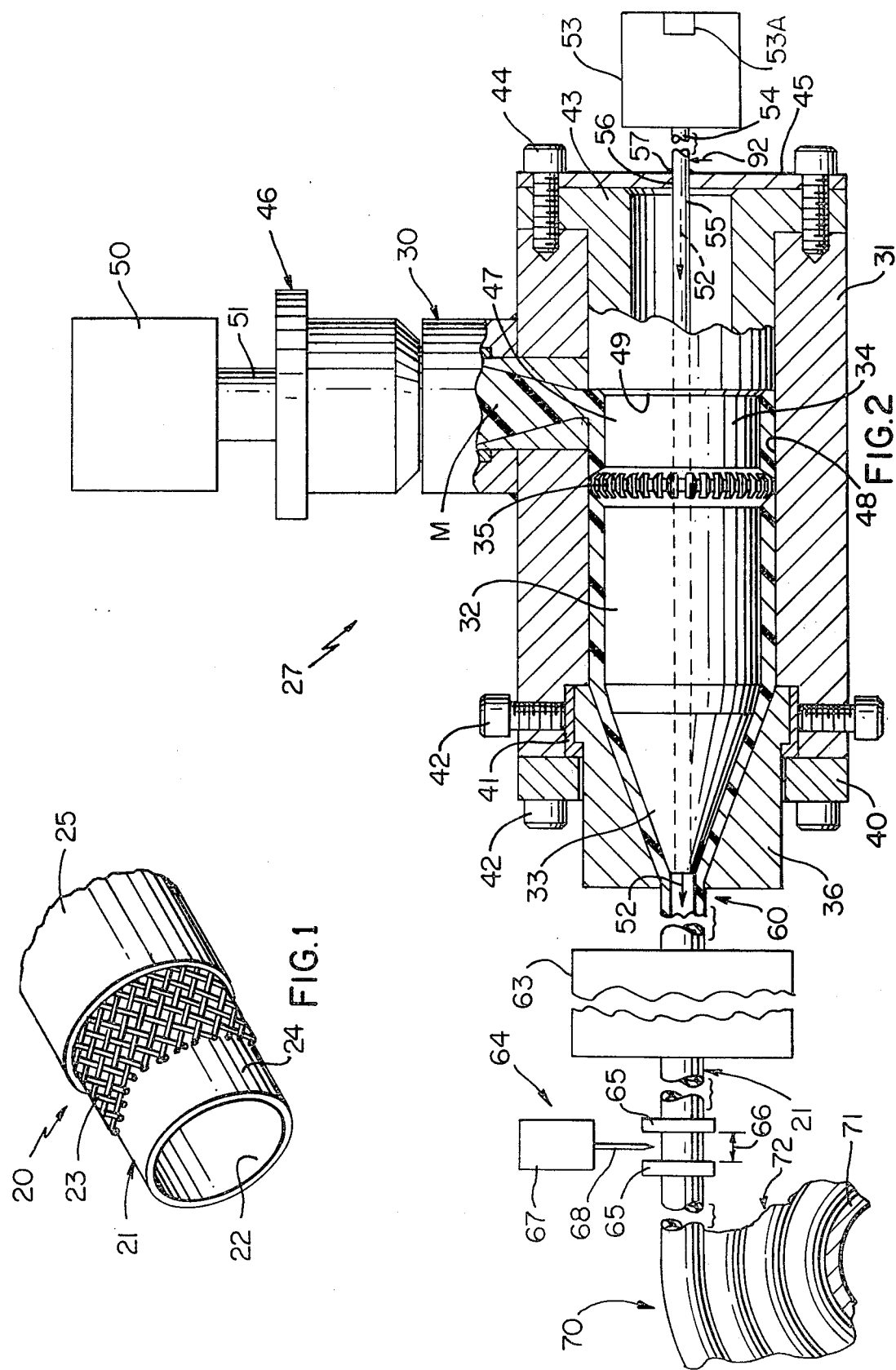

METHOD OF MAKING HOSE CONSTRUCTION

BACKGROUND OF THE INVENTION

1. Field of the Invention

This invention relates to a polyolefin hose construction and method of making same wherein such hose construction may be used to contain and convey so-called nonpolar hydrocarbon fluids.

2. Prior Art Statement

Modifying certain types of polymeric materials with halogen gas to achieve various results has been known. However, the inventor is not aware of any specific products or processes in the prior art which teach the present invention. The closest prior art known, and its relevance to the present invention, are set forth below.

Henderson U.S. Pat. No. 2,502,841
Brown U.S. Pat. No. 2,690,769
Joffre U.S. Pat. No. 2,811,468
Utz U.S. Pat. No. 3,184,358
Binder U.S. Pat. No. 3,528,260
Dixon et al U.S. Pat. No. 3,862,284

Henderson refers to treating a polyethylene film with chlorine in order to render it more receptive to printers ink. The product is different from that of the present invention, which treats the inner portion of a tube that is part of a hose assembly, with fluorine gas.

Brown covers a hose with a polyethylene inner layer, a rubber sleeve, and a reinforcing layer between. Such a hose could not be used to convey fluids such as applicant refers to, without treating the inner layer as taught by applicant.

Joffre relates to polyethylene film which is treated with fluorine in order to use the film as a packaging material, so that the products which are wrapped do not pass through the film. This patent, like Henderson, fails to teach a concept of such a use in a hose conveying hydrocarbons, nor the use of a treated material as an inner portion of a hose.

Utz shows a process of extruding and laminating two separate tubes of various thermoplastic materials, such as polyethylene, nylon, PVC, etc. In order to bond the tubes together, the mating faces are exposed to a gas, preferably a halogen. However this patent does not suggest treatment of an inner tubular surface which is an integral part of a tube.

Binder relates to a refrigeration hose made of refrigerant-resistant compounds such as a cross-linked chlorinated polyethylene and a synthetic rubber material. These compounds are clearly blends of elastomers and polymeric materials, but do not suggest an inner tubular surface which is a separate but integral part of a hose.

Dixon et al involves a process of blow molding bottles into which is mixed fluorine gas and an inert gas. However this is taught only in conjunction with blow molding, not extrusion, and results in the fluorination of the entire resulting product, not the treating of an inner hose surface.

SUMMARY OF THE INVENTION

It is a feature of this invention to provide a hose construction comprised of a polyolefin tube having a fluorocarbon composition defining a portion of the tube, thus defining a barrier layer rendering the tube substantially impermeable to passage of the hydrocarbons.

Another feature of this invention is to provide a hose construction comprised of an extruded polyolefin tube having inner and outer portions, the inner portion having a fluorocarbon composition to define a barrier layer rendering the tube substantially impermeable to the passage of hydrocarbons.

Another feature of this invention is to provide a hose construction of the character mentioned in which the polyolefin tube is a polyethylene tube.

Another feature of this invention is to provide a hose construction of the character mentioned having a tube of the character mentioned and having a plurality of layers, including at least one reinforcing layer, disposed concentrically around such tube.

Another feature of this invention is to provide an improved method of making a hose construction comprising the steps of extruding a polyolefin material to define a seamless tube and treating the inner surface of the tube to define an integral barrier layer having a fluorocarbon composition, the barrier layer rendering the tube substantially impermeable to the passage of hydrocarbons therethrough.

Another feature of this invention is to provide a method of the character mentioned in which the treating step comprises treating the inner tubular surface with fluorine.

Another feature of this invention is to provide a method of the character mentioned in which the treating step comprises the preparation step of mixing fluorine gas with inert gas to define a treating gas mixture having a predetermined ratio of fluorine to inert gas.

Another feature of this invention is to provide the method of the character mentioned wherein the step of treating the tube is achieved in a continuous manner substantially simultaneously with extrusion thereof.

Another feature of this invention is to provide a method of the character mentioned in which the treating step is achieved subsequent to extrusion.

Another feature of this invention is to provide a method of the character mentioned and comprising the further step of purging any fluorine gas remaining within the tube after the treating step in a suitable disposing apparatus.

Therefore, it is an object of this invention to provide an improved hose construction and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view with parts broken away illustrating one exemplary embodiment of the hose construction of this invention comprised of an inner tube, a reinforcing layer around such tube, and a protective sleeve around the reinforcing layer;

FIG. 2 is a view with parts in cross-section, parts in elevation, parts broken away, and parts shown schematically illustrating one exemplary embodiment of the apparatus and method used in making the inner tube of the hose construction of FIG. 1;

DESCRIPTION OF ILLUSTRATED EMBODIMENTS

Figure 3:
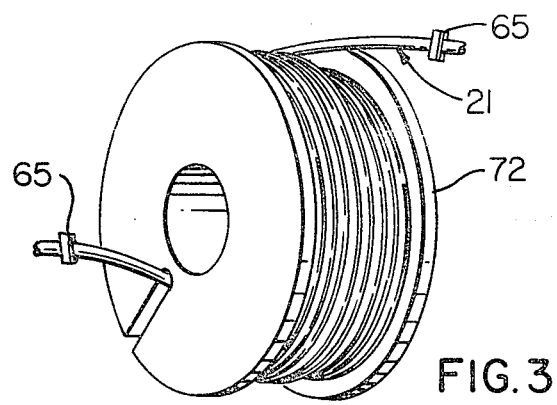
FIG. 3 is a perspective view of the inner tube as defined employing the apparatus and method of FIG. 2 wound on a typical supply roll thereof.

Reference is now made to FIG. 1 of the drawings which illustrates a fragmentary portion of an exemplary hose construction of this invention and such hose construction is designated generally by the reference numeral 20. The hose construction 20 is unique in that it has an inner tube 21 which has an integral barrier layer which is substantially impermeable to the passage of hydrocarbons therethrough and such tube and barrier layer will be described in detail hereinafter.

The tube 21 may be made of a suitable polymeric material and preferably of a polyolefin such as polyethylene; and, such tube has an integral inner portion which is designated generally by the reference numeral 22 and indicated by a comparatively thick bold line in FIG. 1. The inner portion acts a barrier layer which renders the tube 21, and hence the entire hose construction 20, substantially impermeable to the passage of vapors therethrough, including vapors of nonpolar hydrocarbons. The layer 22 of this example is a fluorocarbon barrier layer defined by treating the inside of the tube 21 with a fluorine gas mixed with a suitable inert gas in a manner to be subsequently described.

The hose construction 20 has one or more layers disposed concentrically outwardly of tube 21 and in the example shown, a single reinforcing layer 23 is suitably braided concentrically around and against the outside surface 24 of the tube 21. However, the reference numeral 23 is understood to apply to a plurality of such layers. It is also contemplated to form such layers by knitting or spiral wrapping. The hose construction 21 also has a protective sleeve 25, preferably made of a polymeric or elastomeric material, which is disposed concentrically around and against the braided reinforcing layer 23 and for the purpose of protecting the tube 21 and reinforcing layer 23 while isolating these components 21, 23 from being contacted by deleterious materials.

The tube 21 of the hose construction 20 is a seamless tube and is made employing an extrusion apparatus and method in accordance with the teachings of this invention and such apparatus and method are designated generally by the reference numeral 27 and shown primarily in FIG. 2. The tube 21 is made in what is basically a continuous substantially uninterrupted process whereby such tube may be of indefinite length.

The extrusion apparatus 27 basically comprises a cross-head extruder assembly or apparatus which is designated generally by the reference numeral 30 and such apparatus comprises a main body 31 which supports a sizing mandrel 32 therein. The mandrel 32 has a forward bullet-nosed or frustoconical portion 33 and a central cylindrical portion 34 provided with integral circumferential splines or teeth 35. The inside diameter of the tube 21 and the wall thickness thereof are defined by the relative position of the bullet-nosed portion 33 within an outer die 36 of the extruder 30.

The die 36 is suitably detachably fastened and adjusted relative to the main body 31 by a front clamp ring 40 and a cooperating adapter 41. A plurality of threaded fastening bolts 42 are threaded into the forward part of the body and operatively associated with the clamp ring 40 and adapter 41 to hold the outer die 36 at any desired position relative to the foward portion 33 of the sizing mandrel 32 and thereby control the inside diameter and wall thickness of the tube as previously mentioned.

The mandrel 32 also has a rear structure 43 which is suitably fixed in position by a plurality of threaded fastening bolts 44 and a flat metal disc or seal 45 is provided and fixed against the rear structure 43 for a purpose to be subsequently described. The seal 45 is also held in fluid-tight relation by the threaded fastening bolts 44.

The extrusion apparatus 30 has a suitable coupling assembly which is designated generally by the reference numeral 46 for providing flowable polymeric material to the die body 31. The assembly 46 has its discharge end which operatively communicates with an annular chamber 47 in the body 31; and, the chamber 47 is defined by a cylindrical inside surface 48, which defines a bore through the body 31 and lower portion of the assembly 46, cooperating with the outside surface of the cylindrical portion 34 rearwardly of teeth 35 and a forward beveled surface 49 of rear structure 43.

The coupling assembly 46 is provided with flowable polymeric mat4rial, which is designated generally by the reference letter M, from extruder 50 of known construction. The polymeric material is a plastic material and in this example of the invention is a polyolefin in the form of molten polyethylene M. The polyethylene is provided from the extruder 50 to the coupling assembly 46 employing a suitable conduit 51. As is known in the art a heater (not shown) may be provided concentrically around the main body 31 to control the temperature of the molten polyethylene during extrusion thereof through such main body 31.

In accordance with the teachings of this invention the inside of the tube 21 is treated during extrusion forming thereof with a halogen gas and in this example of the invention the halogen gas is preferably in the form of fluorine gas which is mixed with a suitable inert gas to define a treating gas mixture which is indicated schematically by arrows 52 in FIG. 2. The treating gas mixture 52 is provided from a suitable source after suitably mixing the fluorine gas with the inert gas and such source is indicated schematically by a rectangular outline 53 with the mixing step being indicated by a rectangular outline 53A within the source 53.

The treating gas mixture 52 is provided to the extrusion apparatus 30 by a conduit 54 which communicates in fluid-tight relation with a tube 55 which extends centrally within the body 31 of the apparatus 30 while extending centrally through sizing mandrel 32. The tube 55 which extends through a central opening 56 in the metal seal 45 and is sealed in fluid-tight relation to such seal by a weld 57. The tube 55 discharges the treating gas mixture 52 at the terminal (small diameter) end of the frustoconical portion 33 of the mandrel 32 within the tube 21 as it is newly or freshly formed at what may be considered a treating station 60.

The apparatus 30 defines the tube 21 as a seamless extruded tube in a substantially continuous operation and substantially simultaneously with the extrusion of such tube the inside thereof is treated at station 60 with the treating gas mixture 52 to define the integral barrier layer 22 as the inner layer portion 22 of such tube. The treated tube 21 is then moved through a vacuum sizing and cooling apparatus 63, which may be of any suitable type known in the art, for the purpose of finally sizing and cooling same; and, the treated and sized tube is then moved to a cutting station 64.

At the cutting station 64 a pair of substantially identical sealng clamps 65 are provided around the tube 21 with a comparatively small tube length 66 between such clamps. Each of the clamps 65 serves to seal the tube portion clamped therewithin to prevent passage of any fluid therethrough. A cutting device 67 is also provided at the cutting station 65 and such device has a cutting blade 68 which is used to cut completely through the tube 21 once both clamps 65 are clamped in position.

The use of clamps 65 and cutting device 67 at station 64 enable the tube 21 to be cut with very little loss of treating gas mixture 52. Basically only the amount of mixture 52 within tube length 66 is lost. Further, the entire apparatus 27, including station 64, is preferably provided in a hooded and adequately vented facility so that even the small amount of treating gas mixture contained within the tube length 66 is quickly diluted with a large volume of ambient air and safely discharged to ambient atmosphere.

Following cutting and clamping of the tube 21 at the cutting station 64 a leading end portion of the treated tube 21 is then suitably wound on a core 71 at a tube winding station 70 to define a suitable supply roll 72 thereof, FIGS. 2 and 3. After a desired length of treated tube 21 is wound on core 71, the cutter 67 at the cutting station 64 is again employed to cut between the spaced and previously tightened clamps 65 whereby the trailing end of the tube 21 wound on a previously wound supply roll and the leading end of the tube 21 to be wound on another supply roll are defined and sealed whereby the operation is repeated to define another supply roll 72.

Figure 4:
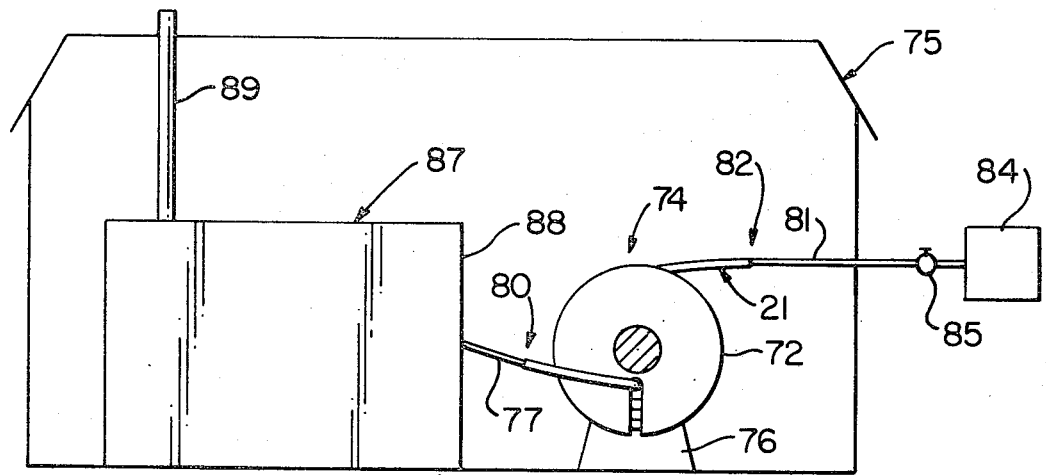
FIG. 4 is a primarily schematic view illustrating an apparatus for and method of purging and disposing fluorine gas remaining within the tube wound on the supply roll of FIG. 3.

After defining a supply roll 72 of the wound tube 21 having sealed clamps 65 at its opposite ends, the supply roll is then introduced into a purging station 74 which is provided in an enclosing structure 75, FIG. 4. At the purging station 74 the supply roll 72 is mounted on a suitable support 76 and the opposite ends of the tube 21 placed in flow communication with suitable conduits as will now be described. In particular, one end of the tube 21 is connected in fluid tight relation with a pipe 77 as shown at 80 and the opposite end of the tube 21 is connected in fluid-tight relation with a pipe 81 as shown at 82.

The pipe 81 extends through the enclosing structure 75 in a fluid-tight manner and is provided with clean dry air from an air supply source which is indicated schematically by a rectangular block 84. A shut-off valve 85 is provided for controlling the flow of clean dry air through the pipe 81 and into and through the tube 21. Once the pipes 77 and 81 are connected to the tube 21 and the valve 85 opened, air under pressure from the source 84 flows through the tube 21 and purges the interior of such tube of treating gas mixture remaining therein. The purging apparatus and method employed at station 74 comprise the apparatus and method 27 of this invention.

The apparatus and method 27 also comprises a scrubbing station 87 within the enclosing structure 75. At the station 87 a scrubbing apparatus 88 is provided and although the scrubbing apparatus 88 may be of any suitable type known in the art such apparatus preferably employs a caustic scrubbing system. The caustic scrubbing system uses a liquid which reacts with the fluorine gas in the gas mixture as is known in the art thereby removing such fluorine gas from the gas mixture 52. The caustic material employed in the apparatus 88 is replaced periodically, as is known in the art. The apparatus 88 has a vent 89 which is provided in fluid flow communication therewith and extends through the roof in the enclosing structure 75. The vent 89 discharges to ambient air the nontoxic gases produced by the fluorine scrubbing reaction with the caustic material.

As indicated earlier, clean dry air from the source 84 serves as purging gas; however, it is to be understood that an inert gas such as nitrogen may be provided as the purging gas, if desired.

From the foregoing description it is seen that the tube 21 is extruded and substantially simultaneously treated with the gas mixture 52. However, it may be desirable to treat the inside of the tube 21 with the treating gas mixture 52 subsequent to its extrusion.

In this latter instance, instead of introducing the treating gas mixture 52 as shown in FIG. 2, an inert gas preferably in the form of nitrogen is introduced at the treating station 60 in a similar manner as previously shown and described for the treating gas mixture 52. The nitrogen is introduced into the pipe 55 through a conduit 92 indicated schematically by an arrow in FIG. 1. The nitrogen gas is introduced so that the freshly exposed inside surface of the tube 21 defined by the extrusion process will not be contacted by oxygen from ambient air inasmuch as it is known in the art that oxygen will adversely affect the treatment of the inside of the tube 21 with a treating gas containing a halogen such as fluorine. With this exception, the operation is continued in the manner previously described and at the cutting station 64 the nitrogen is sealed within the tube 21 which is wound to define a supply roll 72 thereof.

Figure 5:
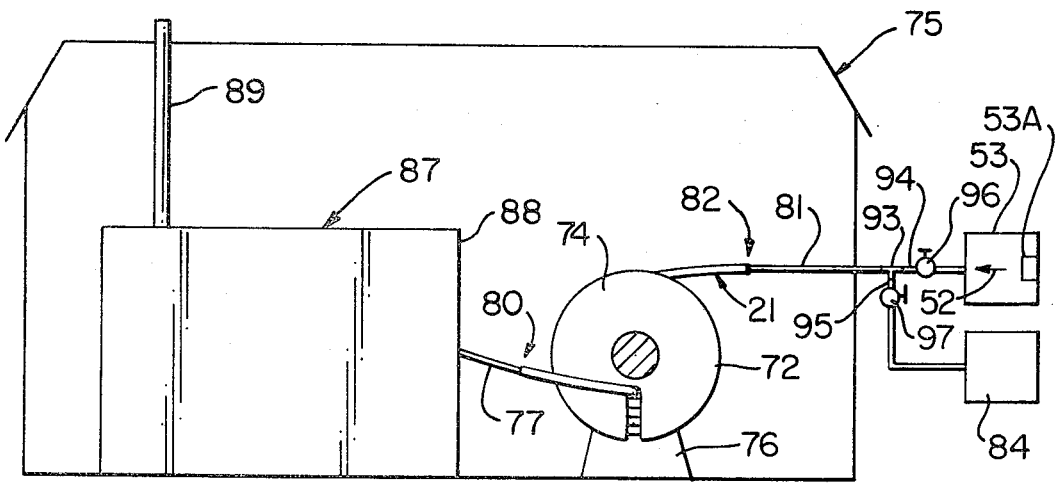
FIG. 5 is a view similar to FIG. 3 illustrating a modified technique for treating the inside surface of the tube after extrusion thereof and immediately thereafter purging and disposing fluorine gas remaining within such tube.

The supply roll 72 containing nitrogen therewithin is introduced into the enclosing structure 75 as shown in FIG. 5. In the structure 75 the roll 72 is supported on the fixture 76 in a similar manner as described earlier at station 74 which in this instance serves as a treating and purging station.

In a similar manner as previously described, one end of the tube 21 is connected to the pipe 77 as shown at 80 and the opposite end of such tube is connected to the pipe 81 as shown at 82. The pipe 81 extends through the enclosing structure 75 and is flow communication with one arm of a T-connector 93. The T-connector 93 has its opposite arm connected to a pipe 94 and its leg connected to a pipe 95. The pipe 94 has a shut-off valve 96 provided therein closely adjacent the connector 93 and the pipe 95 has a shut-off valve 97 therein also provided closely adjacent the connector 93.

The pipe 94 is in fluid flow communication with a source of treating gas mixture 52 and such source is designated by the reference numeral 53 in a similar manner as the source illustrated in FIG. 2; and, the mixing of the treating gas 52 is indicated at 53A. The pipe 95 is in fluid flow communication with a source 84 of clean dry air. The treatment of the tube 21 containing nitrogen is achieved by closing the valve 97 and allowing treating gas mixture 52 from the source 53 to flow through the open shut-off valve 96 forcing out the nitrogen previously contained in the tube 21 and thereby treating the inside of such tube with the treating gas mixture 52. Once the treatment has been achieved for a suitable time increment, the valve 96 is closed and the valve 97 opened whereby clean dry air from the source 84 is used to purge any treating gas and its fluorine contained within the tube 21. Once the purging action is complete, the shut-off valve 97 is also closed. Thus, it is seen that the station 74 serves as a treating and purging station.

It will also be appreciated that, as described previously, instead of using clean dry air from the source 84 for the purging action a suitable inert gas such as nitrogen may be used for this purpose.

The extrusion apparatus and components associated therewith used to handle the treating gas 52 may be made of common materials including known alloys of steel, stainless steel, brass, nickel, copper, and the like even though these materials are contacted by the fluorine gas. In actual operation it has been shown that a fluoride film is formed on metallic components contacted by fluorine and once such film is formed further reaction does not occur. This initial production of a fluoride film is often referred to in the art as passivation. After passivation is complete the passivated components may be employed in handling fluorine for substantial time periods compatible with mass production processing and manufacture of the tube 21.

In this disclosure of the invention, the fluorine contained within the tube 21 after treating the inside of such tube with the gas mixture 52 may be purged by clean dry air or by an inert gas such as nitrogen as previously described. After purging the fluorine removed by the purging operation has been described as being scrubbed utilizing a caustic scrubbing material. However, it will be appreciated that the purged fluorine may be burned as is known in the art.

Reference has been made herein to the utilization of fluorine to provide the fluorocarbon barrier layer of the inner portion of the polyolefin (polyethylene) tube 21; however, it is to be understood that the other halogens (iodine, chlorine, and bromine) may be used for this purpose. Similarly, it will be appreciated that other inert gases, other than nitrogen, may be employed to provide the gas mixture and/or the inert gas used to prevent oxidation of the freshly extruded tube in connection with the presentation of FIG. 5.

The tube 21 and hence hose 20 made in accordance with this invention has the integral barrier layer 22; and, as disclosed such barrier layer 22 renders the tube substantially impermeable to the passage of vapors and the like therethrough. Further, it has been found that nonpolar hydrocarbons usually having high solubility in a polyolefin such as polyethylene may be contained and conveyed within tube 21 with substantially no loss through such tube.

During the process of treating the inside of the freshly extruded tube with the gas mixture 52 the thickness of barrier layer 22 defined thereby may vary depending upon the length of the reaction and the amount of halogen gas such as fluorine in the treating gas mixture. Further, it has been found that treating gas mixtures which define the barrier layer 22 may define such layer having a thickness ranging between ½ mil and 1½ mils.

It is known in the art that the chemical reaction which produces the fluorocarbon layer 22 in a polyethylene tube may be expressed as follows:

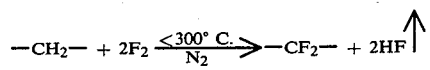

As indicated earlier, the amount of halogen gas and inert gas mixed to define the treating gas mixture 52 may vary. However, it has been found that in the case of fluorine and nitrogen that the amount of fluorine may range from 0.1 percent to 10 percent by volume with the balance consisting of nitrogen to define any particular treating gas mixture.

While present exemplary embodiments of this invention, and methods of practicing the same, have been illustrated and described, it will be recognized that this invention may be otherwise variously embodied and practiced within the scope of the following claims.

I claim:

1. In a method of making a hose construction for conveying fluids having nonpolar hydrocarbons comprising the step of providing a seamless tube of a polyolefin material and of indefinite length, and treating the inner surface of said tube with a fluorine gas to define a barrier layer having a fluorocarbon composition as an integral portion of said tube, said barrier layer rendering said tube substantially impermeable to said hydrocarbons, the improvement comprising the steps of disposing an inert treating gas inside said tube as said tube is being extruded from a mass of said material through a tube forming die means so that the inner surface of said tube is maintained oxygen free at the time of forming thereof, sealing a leading end portion of said tube to prevent loss of said treating gas, winding the treated tube to define a first supply roll thereof, cutting said tube between a pair of sealing clamps after extruding a predetermined length thereof thereby sealing both the trailing end of said tube wound on said first supply roll and a leading end of said tube to be wound on another supply roll, forcing said fluorine gas through said trailing end of said tube while in said first supply roll thereof to displace said inert treating gas and to treat said inner surface thereof while the same is still oxygen free, and, thereafter, purging said fluorine gas from said tube while still in said first supply roll thereof by forcing a purging gas through said trailing end thereof.

2. A method as set forth in claim 1 in which said polyolefin is polyethylene.

3. A method as set forth in claim 1 in which said treating step comprises treating said inner surface with said fluorine gas after said fluorine gas has been mixed with an inert gas.

4. A method as set forth in claim 3 wherein said step of mixing said fluorine gas with said inert gas to define a treating gas mixture prior to said treating step causes said fluorine gas to comprise between 0.1 and 10 percent of said treating gas mixture.

5. A method as set forth in claim 4 in which said inert gas is nitrogen.

* * * * *